United States Patent [19]

Corrigan et al.

[11] 4,232,754
[45] Nov. 11, 1980

[54] EQUALIZER BAR PAD CONSTRUCTION

[75] Inventors: Ara L. Corrigan, Davenport; Wayne G. Styck, Bettendorf; Gerald M. Walden, Davenport, all of Iowa

[73] Assignee: Caterpillar Tractor Co., Peoria, Ill.

[21] Appl. No.: 83,999

[22] Filed: Mar. 19, 1979

[51] Int. Cl.³ .............................................. B62D 55/00
[52] U.S. Cl. .................................. 180/9.5; 267/63 R; 280/112 R
[58] Field of Search ..................... 280/112 R; 180/9.5, 180/9.54; 267/63 R

[56] References Cited

U.S. PATENT DOCUMENTS

| 3,759,541 | 9/1973 | Peterson | 280/112 R |
| 4,018,295 | 4/1977 | Hasselbacher | 180/9.5 |

Primary Examiner—John J. Love
Assistant Examiner—John A. Carroll
Attorney, Agent, or Firm—Wegner, Stellman, McCord, Wiles & Wood

[57] ABSTRACT

PCT No. PCT/US79/00177 Sec. 371 Date Mar. 19, 1979 Sec. 102(e) Date Mar. 19, 1979 PCT Filed Mar. 19, 1979 Ser. No.

An energy-absorbing preloaded pad assembly (17,117) for use in stabilizing relatively movable portions of a structure, such as vehicle structure (10). The stabilizing pad assemblies may be utilized for stabilizing oscillations of a stabilizer bar (12) relative to a frame (11) of a vehicle (10) and may include preloaded pads (19). A removable clamp (21,121) cooperates with a cover plate (20,120) of the pad assembly to provide the desired preload to the pad and permit facilitated installation of the stabilizer bar in the vehicle structure, such as to permit ready installation of the pivot structure (113). Upon assembly of the vehicle structure, the removable clamp (21,121) is disassembled permitting reuse thereof with other similar pad assemblies. Removal of the clamp frees the pad for stabilizing functioning in the assembly in the normal manner. In one form, the pad baseplate is secured to the stabilizer bar by bolts disposed substantially at the neutral axis of the stabilizer bar and in another form, the baseplate is retained on the stabilizer bar by a pair of downwardly turned securing portions (132a, 123b) and an end tongue (138).

17 Claims, 5 Drawing Figures

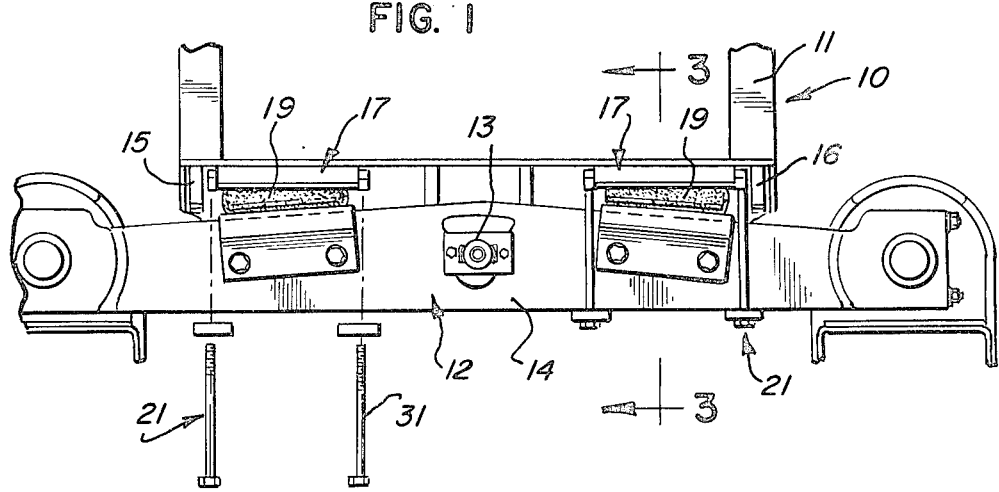
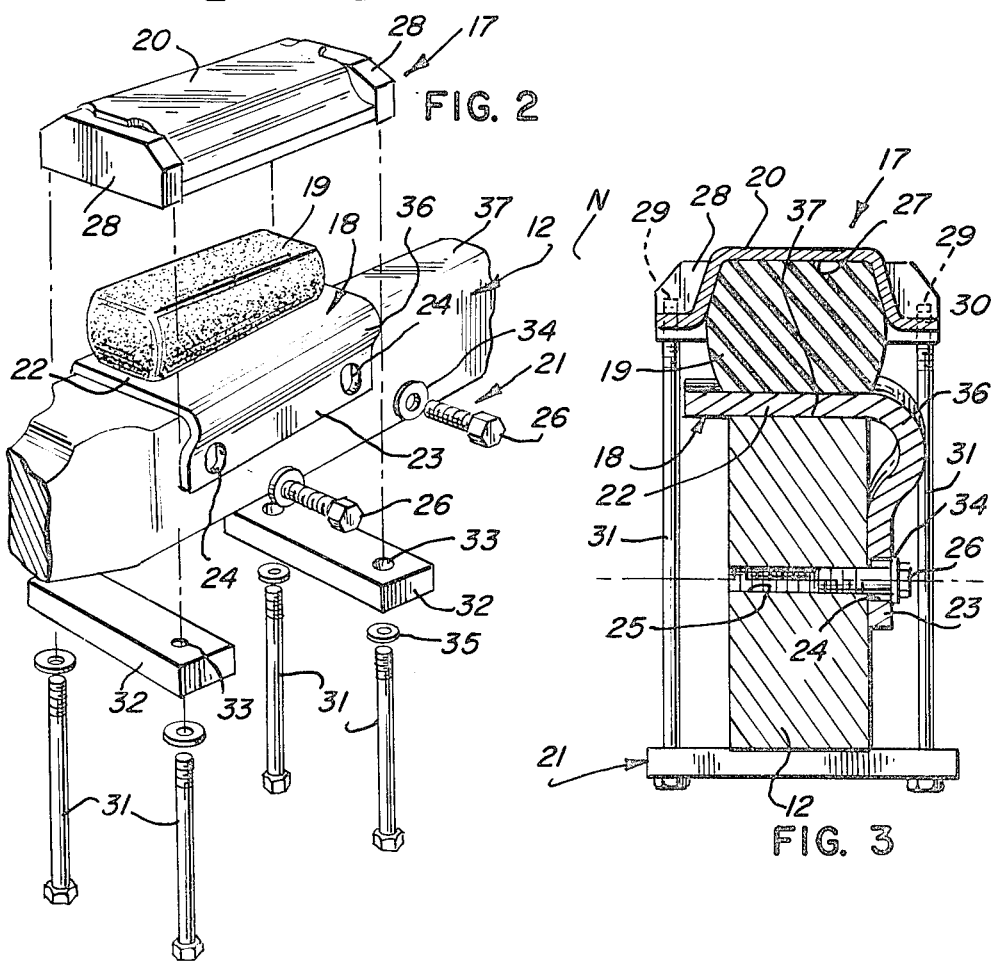

EQUALIZER BAR PAD CONSTRUCTION

DESCRIPTION

1. Technical Field

This invention relates to vehicle constructions and in particular to an equalizer bar pad structure for use therein.

2. Background Art

As shown in U.S. Pat. No. 3,759,541 of Robert A. Peterson, which patent is owned by the assignee hereof, a stabilizer for articulated wheel loaders is provided for improving the lateral stability of an oscillating rear axle portion of the vehicle. The stabilizer includes resilient members mounted between the rear axle and the frame of the vehicle so as to prevent unrestrained oscillation of the vehicle in relation to the frame. As shown in FIG. 3 of that patent, the resilient member is captured between the frame and the rear axle. The resilient member comprises a cylindrical rubber pad which is preferably hollow, having lower and upper plates bonded to the opposite ends thereof with the lower plate being secured to the housing of the axle as by bolting, welding, etc., and the upper plate providing a bearing surface for engaging the frame. A cylindrical casing extends partially downwardly from the upper plate in outwardly spaced circumferential relation to the pad.

A problem has arisen in the installation of such stabilizer structures in that the pad must be compressed into a preloaded condition by use of a crane, hydraulic jack, rack device, etc. Conventionally, the axle is pivotally mounted and it has been found difficult to align the mounting hole of the axle with the pivot pin while maintaining the preload on the stabilizer pads.

DISCLOSURE OF THE INVENTION

The present invention comprehends an improved stabilizer structure for use in such a vehicle assembly wherein the stabilizer pads are preloaded in a novel and improved manner.

More specifically, the invention comprehends the provision of such preloaded energy-absorbing pad assemblies including a baseplate carried by an equalizer bar of the vehicle assembly. A resiliently compressible pad is carried on the baseplate. A cover plate overlies the pad to engage the vehicle frame and is provided with a connecting portion.

A removable clamp is provided with a first portion removably secured to the connecting portion of the cover plate and a second portion releasably locked to the equalizer bar as an incident of a clamping force being developed in the clamp to compressively preload the pad between the cover plate and baseplate.

Release of the clamp upon completion of the installation of the pivot pin in the vehicle assembly permits the pad to urge the cover plate forcibly against the frame and provide a preselected resistance to movement of the equalizer bar toward the frame during operation of the vehicle.

The clamp may define a U-shaped structure embracing the equalizer bar. The clamp includes leg portions removably secured to the cover plate connecting portion for providing the preload to the pad during the assembly of the vehicle. Upon completion of the assembly, the clamp may be readily removed from engagement with the cover plate, permitting the pad to function in the normal stabilizing manner through the cover plate and against the frame, as indicated above.

In the illustrated embodiment, the clamp is threadedly connected to the cover plate.

In the preferred embodiment, the cover plate includes the top portion carrying the pad and a depending securing portion which extends downwardly from the top portion to one side of the equalizer bar.

The depending securing portion preferably extends to at least approximately the midportion of the equalizer bar so as to permit the threaded securing means to be utilized at substantially the neutral axis of the equalizer bar thereby effectively minimizing stress concentrations and providing improved life of the vehicle structure.

In the illustrated embodiment, the securing portion of the baseplate extends from one edge of the top portion only.

In the illustrated embodiment, the depending securing portion is connected to the top portion by a protuberant connection permitting limited movement of the top portion relative to the top of the stabilizer bar.

The cover plate defines a downwardly opening concave element receiving the top portion of the pad and effectively retaining the pad positionally within the assembly.

In a modified form of the invention, the baseplate is provided with a pair of depending flanges, one each at the front and rear thereof so as to embrace the top of the equalizer bar.

One end of the baseplate may be provided with a tongue adapted to engage a depending stop portion of the frame so as to limit movement of the baseplate along the equalizer bar. In this embodiment, the baseplate is effectively frictionally retained to the top of the equalizer bar by the action of the compressed pad acting downwardly therethrough.

The stabilizer pad structure of the present invention is extremely simple and economical of construction while yet providing a highly improved stabilizing functioning as discussed above.

BRIEF DESCRIPTION OF THE DRAWING

FIG. 1 is a fragmentary elevation of a portion of a vehicle having a stabilizer bar pivotally mounted to a frame with the oscillatory movement of the stabilizer bar relative to the frame being stabilized by a pair of energy-absorbing pad assemblies embodying the invention;

FIG. 2 is a fragmentary exploded view of one of the energy-absorbing pad assemblies;

FIG. 3 is a fragmentary enlarged vertical section taken substantially along the line 3—3 of FIG. 1;

BEST MODE OF CARRYING OUT THE INVENTION

Figure 4:
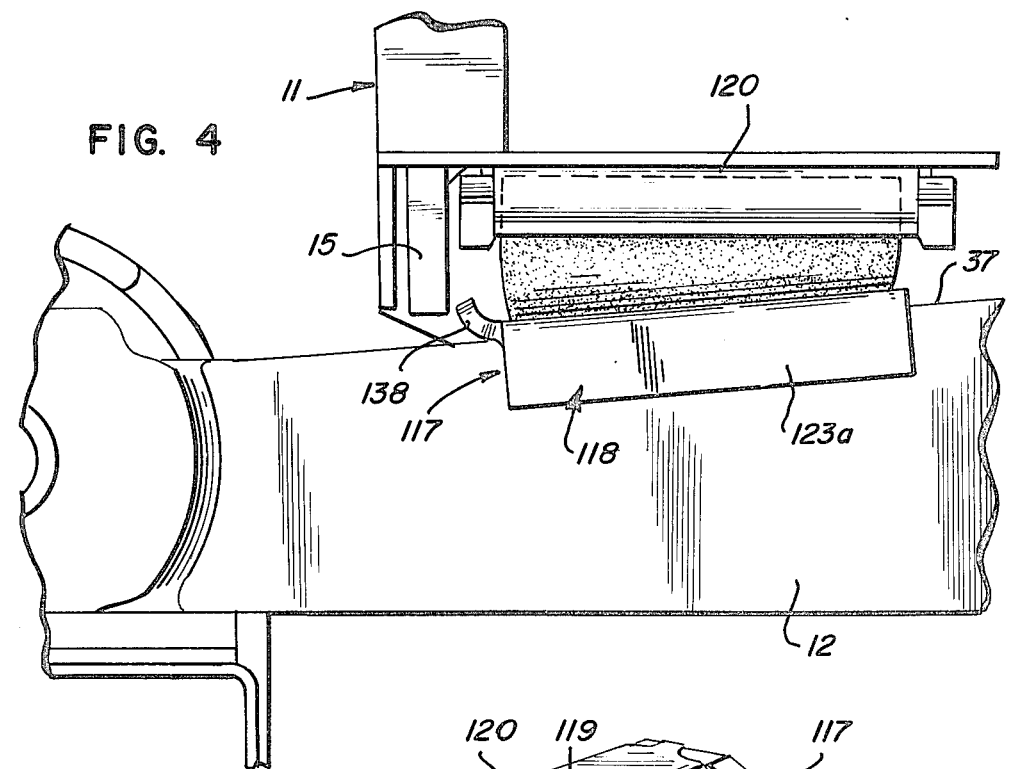
FIG. 4 is a fragmentary enlarged elevation illustrating a modified form of energy-absorbing pad assembly embodying the invention.

In the exemplary embodiment of the invention as disclosed in FIGS. 1—3 of the drawing, a vehicle structure generally designated 10 is shown to include a frame 11. A stabilizer bar 12 is pivotally mounted to the frame by a pivot 13 at a midportion 14 of the stabilizer bar. Limited pivotal movement of the stabilizer bar is permitted by suitable stops 15 and 16 carried by the frame.

A pair of preloaded energy-absorbing pad assemblies generally designated 17 is provided one each at opposite sides of the pivot 13. The pad assemblies are reversely similar, as shown in FIG. 1, and the structure thereof is shown in greater detail in FIGS. 2 and 3.

More specifically, each of the pad assemblies 17 includes a baseplate generally designated 18, a resiliently compressible pad 19, a cover plate 20, and a removable clamp structure generally designated 21. As shown, the baseplate includes a top portion 22 overlying the stabilizer bar 12 and a securing portion 23 depending from the top portion. The securing portion extends preferably at least approximately one-half the height of the equalizer bar 12 and is provided with a pair of openings 24 located approximately halfway between the top and bottom of the equalizer bar so as to be aligned substantially with the neutral axis N of the stabilizer bar. As shown in FIG. 3, the stabilizer bar may be provided with a pair of through bores 25 aligned with the openings 24 of the baseplate 18 and are threaded so as to have threaded engagement with a pair of bolts 26 extended through openings 24 to secure the baseplate 18 to the stabilizer bar.

Pad 19 comprises a resiliently compressible pad formed of a material, such as rubber, which may be bonded to the top portion 22 of the baseplate as by being vulcanized thereto. As shown in FIG. 3, the cover plate defines a downwardly opening recess 27 receiving the top portion of the pad 19. As shown in FIG. 2, the cover plate further includes end portions 28 which, as shown in FIG. 3, may include threaded downwardly opening recesses 29 for receiving the threaded ends 30 of tie bolts 31 forming a portion of the clamp assembly 21.

As shown in FIG. 2, the clamp assembly 21 further includes a pair of pressure bars 32 provided with through openings 33 for passing the threaded tie rods 31. As shown in FIG. 2, hardened steel washers 34 may be associated with bolts 26 and hardened steel washers 35 may be associated with tie bolts 31.

As best seen in FIG. 3, support portion 23 may be connected to the top of portion 22 of baseplate 18 by a protuberant connecting portion 36 which permits limited movement of the top portion 22 relative to the top surface 37 of the stabilizer bar.

In the illustrated embodiment, pad 19 of assembly 17 has a length of approximately 10", a height of approximately 4", and a thickness of approximately 3½". The pad is preloaded by means of the clamp structure 21, as shown in FIG. 3, so as to permit facilitated assembly of the equalizer bar and associated vehicle structure relative to the frame. In the illustrated embodiment, the pad 19 is placed under approximately 6700 lbs. of preload force. To effect such preload force, a pressure of approximately 170 psi is applied thereacross by the clamp structure. In the use of the vehicle, the stabilizer bar may oscillate approximately 1° about the pivot 13 thus placing an additional force on the compressed pad of approximately 3800 lbs. so that the total force may be approximately 10,500 lbs. and the pressure being applied thereacross is approximately 267 psi.

Figure 5:
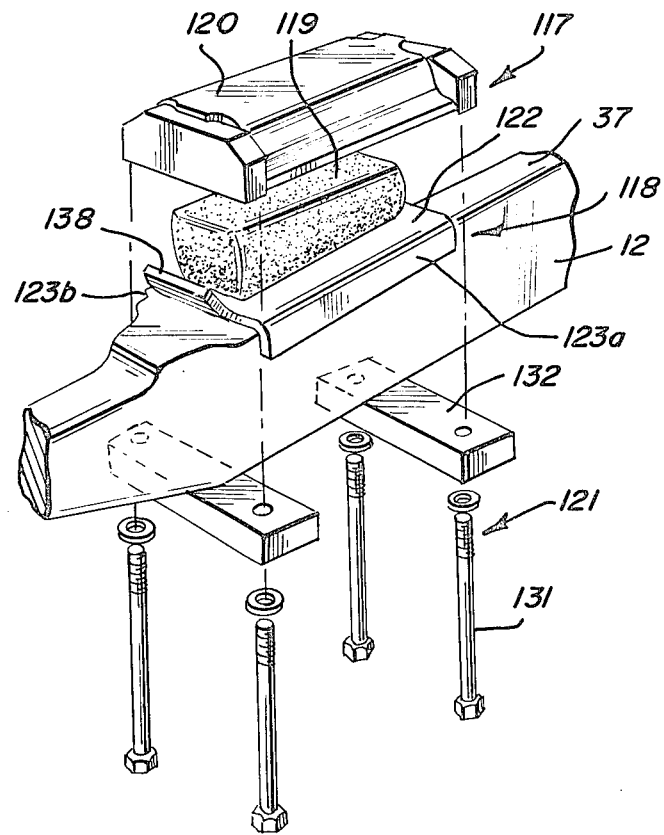
FIG. 5 is a fragmentary exploded view thereof.

Referring now to the embodiment of FIGS. 4 and 5, a modified form of pad assembly generally designated 117 is shown to comprise a pad assembly generally similar to pad assembly 17 but utilizing a modified means for preventing movement of the baseplate 118 relative to the stabilizer bar 12. More specifically, as shown, baseplate 118 includes a top portion 122 having depending side flanges 123a and 123b arranged to embrace the top surface 37 of the stabilizer bar and thus retain the baseplate against lateral movement thereon.

Baseplate 118 is retained against longitudinal movement on the stabilizer bar by means of a tongue 138 extending arcuately from one end of the top portion 122 to adjacent the frame stop, such as frame stop 15 in FIG. 4.

Thus, pad assemblies 117 are similar to and function similarly to the pad assemblies 17. The elements of pad assemblies 117 which are similar to corresponding elements of pad assemblies 17 are identified by reference numerals 100 higher.

Industrial Applicability

The preloaded pad assemblies of the present invention may be utilized in a wide range of industrial applications wherein energy-absorbing compressible means are provided for stabilizing oscillations in relatively moving portions of heavy structure such as found in vehicles and the like. As indicated above, one excellent industrial application is that wherein the pad assemblies are utilized in connection with the stabilizer bar of a track-type vehicle. The relatively high spring rate of the pads of the assemblies provides a stiff suspension while yet reducing shock loads on the vehicle and assuring extended troublefree life thereof. In addition, the utilization of the pad assemblies provides an improved ride for the operator of the vehicle providing further efficiency in the use of the vehicle.

By facilitating the assembly of the vehicle, further cost savings are recognized as discussed above. The reusability of the removable portions of the clamping structure provides further cost saving in the utilization of the invention.

Other aspects, objects and advantages of this invention can be obtained from a study of the drawings, the disclosure and the appended claims. The foregoing disclosure of specific embodiments is illustrative of the broad inventive concepts comprehended by the invention.

We claim:

1. In a vehicle (10) having a frame (11) and an equalizer bar (12) movably mounted to the frame for carrying the ground-engaging tractive means of the vehicle, a pair of preloaded energy-absorbing pad assemblies (17,117), each comprising:
    a baseplate (18,118) carried by the equalizer bar;
    a resiliently compressible pad (19,119) carried on said baseplate;
    a cover plate (20,120) overlying said pad to engage said frame and having a connecting portion (28,128); and
    a removable clamp (21,121) having a first portion (31,131) removably secured to said connecting portion of the cover plate, and a second portion (32,132) releasably locked to said equalizer bar as an incident of a clamping force being developed in said clamp to compressively preload said pad between said cover plate and baseplate, release of said clamp permitting said pad to urge said cover plate forcibly against said frame or provide a preselected resistance to movement of said equalizer bar toward said frame during operation of the vehicle.

2. The preloaded vehicle structure of claim 1 wherein said clamp (21,121) defines a U-shaped structure embracing the equalizer bar and having leg portions (31,131) removably secured to said cover plate (20,120) connecting portion.

3. The preloaded vehicle structure of claim 1 wherein said clamp (21,121) defines a U-shaped structure embracing the equalizer bar and having leg portions (31,131) removably secured to said cover plate (20,120) connecting portion, said clamp further having threaded force-adjusting means (31,131) for effecting a predetermined accurate preloading of said pad.

4. The preloaded vehicle structure of claim 1 wherein said connecting portion (28,128) of the cover plate defines a plurality of spaced threaded recesses (29,129) and said clamp includes a pressure bar (32,132) and tie rods (31,131) releasably engaging the pressure bar and adjustably threaded to said recesses.

5. The preloaded vehicle structure of claim 1 wherein said cover plate (20,120) defines a concave portion (27,127) capturing a portion of the pad (19,119) therein.

6. The preloaded vehicle structure of claim 1 wherein said cover plate (20,120) defines a midportion (27,127) engaged by said pad and opposite end portions (28,128) engaged by said clamp (21,121).

7. The preloaded vehicle structure of claim 1 wherein said cover plate (20,120) defines a midportion (27,127) engaged by said pad and opposite end portions (28,128) engaged by said clamp (21,121), each of said end portions (28,128) defining a pair of threaded recesses (29,129) and said clamps including threaded portions (21,121) removable threaded to said recesses (29,129).

8. The preloaded vehicle structure of claim 1 including means (26,123a,123b,138) for preventing movement of said baseplate (18,118) relative to said equalizer bar (12).

9. The preloaded vehicle structure of claim 1 wherein said connecting portion (28,128) of the cover plate defines a plurality of spaced threaded recesses (29,129) and said clamp includes a pressure bar (32,132) and tie rods (31,131) releasably engaging the pressure bar and adjustably threaded to said recesses, said pressure bar (32,132) and having a plurality of through openings (33,133) and said tie rods (31,131) extending through said openings.

10. The preloaded vehicle structure of claim 1 wherein means (15,16,138) are provided on said frame (11) and baseplate (118) for preventing movement of said baseplate relative to said stabilizer bar (12).

11. The preloaded vehicle structure of claim 1 wherein a tongue (138) is provided on said baseplate (118) having an end portion engaging said frame stop portions (15,16) for preventing movement of said baseplate relative to said stabilizer bar (12).

12. The preloaded vehicle structure of claim 1 wherein said equalizer bar (12) defines a midportion (14) pivotally mounted to said frame, and said preloaded energy-absorbing pad assemblies (17,117) are disposed one each at opposite sides of said pivotally mounted midportion.

13. In a vehicle (10) having a frame (11) and an equalizer bar (12) movably mounted to the frame for carrying the ground-engaging tractive means of the vehicle, said equalizer bar defining a top and a bottom, a pair of preloaded energy-absorbing pad assemblies, each comprising:

a baseplate (118) having a top portion (22,122) at the top of the equalizer bar and a securing portion (23) depending from said top portion (22) at least approximately one-half the height of the equalizer bar (12);

securing means (26) securing said securing portion (23) to the equalizer bar at a midportion thereof approximately midway between the top and bottom of the equalizer bar;

a resiliently compressible pad (19,119) carried on said baseplate;

a cover plate (20,120) overlying said pad to engage said frame and having a connecting portion (28,128); and a removable clamp (21,121) having a first portion (31,131) removably secured to said connecting portion of the cover plate, and a second portion (32,132) releasably locked to said equalizer bar as an incident of a clamping force being developed in said clamp to compressively preload said pad between said cover plate and baseplate top portion (22), release of said clamp permitting said pad to urge said cover plate forcibly against said frame or provide a preselected resistance to movement of said equalizer bar toward said frame during operation of the vehicle.

14. The preloaded vehicle structure of claim 13 wherein said securing means comprises threaded means (24) threaded to said equalizer bar at said midportion thereof.

15. The preloaded vehicle structure of claim 13 wherein said top portion (22) of the baseplate projects beyond said top (37) of the equalizer bar.

16. The preloaded vehicle structure of claim 13 wherein said securing portion (23) of the baseplate comprises a single flange extending from one edge of the top portion (22).

17. The preloaded vehicle structure of claim 13 wherein said securing portion (23) of the baseplate comprises a single flange extending from one edge of the top portion (22) and having a protuberant connecting portion (36) connecting the flange (23) to said top portion (22).

* * * * *